UNITED STATES PATENT OFFICE.

WILHELM HAHNENKAMM, OF SINDLINGEN, NEAR HÖCHST-ON-THE-MAIN, GERMANY, ASSIGNOR TO FARBWERKE VORM. MEISTER LUCIUS & BRUNING, OF HÖCHST-ON-THE-MAIN, GERMANY, A CORPORATION OF GERMANY.

SULFUR DYESTUFFS AND PROCESS OF MAKING SAME.

1,083,489.      Specification of Letters Patent.      Patented Jan. 6, 1914.

No Drawing.      Application filed March 7, 1912. Serial No. 682,281.

*To all whom it may concern:*

Be it known that I, WILHELM HAHNENKAMM, Ph. D., chemist, a citizen of the Empire of Germany, residing at Sindlingen, near Höchst-on-the-Main, Germany, have invented certain new and useful Improvements in New Sulfur Dyestuffs and Processes of Making Same, of which the following is a specification.

I have found that sulfur dyestuffs of great value can be obtained from the indophenolsulfonic acids, which can be produced either by condensing nitrosophenol or its substitution products, or oxidizing p-aminophenol or its substitution products, with the products resulting from the condensation of a para-diamin with a naphthylaminsulfonic acid. For this purpose, the said indophenols are treated with alkali-polysulfids, with or without copper salts, or copper, or any other metallic salt.

The condensation products from which the new indophenolsulfonic acids are derived can be obtained, according to U. S. patent application Ser. No. 682,282, filed March 7th, 1912, by fusing para-diamins (under which term are to be comprised both the mononuclear p-diamins, such as p-phenylene- or toluylenediamins, and naphthylenediamins or their substitution products, and the heteronuclear p-diamins, such as the benzidins and their homologues and substitution products, etc.) with naphthylaminsulfonic acids, such for instance as 1.7 (or 1.8 or 1.2) naphthylaminsulfonic acid, 1.4.8-naphthylamindisulfonic acids or the like; with or without the addition of a solvent or a suspending agent. The mode of operation may for instance be as follows: 44.6 kg. of α-naphthylamin-8-sulfonic acid and 55.2 kg. of benzidin are heated together and the melt thus obtained is liberated in a finely powdered condition from the admixture of benzidin and α-naphthylamin-8-sulfonic acid by repeatedly treating it with a boiling solution of sodium carbonate and precipitating the boiling solution with diluted hydrochloric acid.

The indophenolsulfonic acids are produced in the usual manner by simultaneously oxidizing components yielding indophenols, i. e., phenols containing in para-position to the hydroxyl group a group containing nitrogen which, on condensation with amins, is converted into nitrogen bound in quinoidal manner, including aminophenols and nitrosophenols, with the above-mentioned sulfonic acids. These indophenolsulfonic acids constitute bodies which are insoluble in water and soluble in diluted caustic-soda lye. The sulfuration (sulfur-melt) of the said acids can be obtained at varying temperatures with alkali-polysulfid in various proportion, with or without the addition of a diluent (water, alcohol, glycerin or the like) or of copper or of a metallic salt (for instance a copper salt). The addition of copper or a copper salt has proved to be particularly suitable for producing green dye-stuffs, whereas, when no copper or a copper derivative is added, dyestuffs of a more blue to greenish-blue tint are obtained.

The new dyestuffs, in general, are dark powders, soluble in alkali sulfids to a solution from which the leuco-dyestuff can be precipitated with common salt, insoluble in alcohol, almost soluble in concentrated sulfuric acid to a light-blue solution turning, when heated, to dark-blue, and dyeing cotton from the sulfur-alkaline solution fast blue to green tints.

Example I: 100 kg. of the raw indophenolsulfonic acid produced by oxidizing p-aminophenol together with the product resulting from the condensation of benzidin with 1.7-naphthylaminsulfonic acid, are introduced into an aqueous solution of polysulfid, consisting of 800 kg. of sodium sulfid and 500 kg. of sulfur, and heated in the reflux-apparatus to boiling for about 30 hours, with or without the addition of about 50 kg. of sulfate of copper. The fusion is complete when no further indophenolsulfonic acid can be detected therein. The isolation of the dyestuff is effected according to the methods used in the manufacture of sulfur dyestuffs, for instance by extraction, precipitating by a current of air, filtering by pressure and drying. The dyestuff thus obtained forms, when in a pure state, a greenish-blue powder with a metallic luster, readily dissolving in sodium sulfid to a yellowish solution which dyes cotton beautiful bright green tints, the fastness of which to washing is much superior to that of the dyestuffs described in United States Patent No. 776,885. Moreover the dyeings obtained by the new dyestuff possess an eminent fastness to light.

Example II: 100 kg. of the raw indophenolsulfonic acid produced by oxidizing p-aminophenol together with the product resulting from the condensation of p-phenylenediamin with 1.8-naphthylaminsulfonic acid, are introduced into an aqueous solution of polysulfid, consisting of 800 kg. of sodium sulfid and 500 kg. of sulfur, and heated in a reflux-apparatus to boiling for about 30 hours, with or without the addition of about 50 kg. of sulfate of copper. The fusion is complete when no further indophenolsulfonic acid can be detected therein.

The isolation of the dyestuff is effected according to the methods used in the manufacture of sulfur dyestuffs, for instance by extraction, precipitating by a current of air, filtering with pressure and drying.

The dyestuff thus obtained forms, when in a pure state, a greenish-blue powder with a metallic luster, readily dissolving in sodium sulfid to a yellowish solution which dyes cotton beautiful bright green tints, the fastness of which to washing is much superior to that of the dyestuffs described in United States Patent No. 776,885. Moreover the dyeings obtained by the new dyestuffs possess an eminent fastness to light.

The other sulfid dyestuffs of this new class may be produced in an analogous manner. They are remarkable for their ready solubility and their excellent fastness to washing.

Having now described my invention, what I claim is—

1. The process of manufacturing sulfur dyestuffs, which comprises heating with alkali polysulfids the indophenolsulfonic acids obtainable from the condensation products of p-diamins and naphthylaminsulfonic acids, with phenols containing in para-position to the hydroxyl group a group containing nitrogen which, on condensation with amins, is converted into nitrogen bound in quinoidal manner.

2. The process of manufacturing sulfur dyestuffs which comprises heating with alkali polysulfids the indophenolsulfonic acids obtainable from the condensation products of p-diamins and naphthylaminsulfonic acids with p-aminophenols.

3. The process of manufacturing sulfur dyestuffs, which comprises heating with alkali polysulfids, in presence of a metallic salt, the indophenolsulfonic acids obtainable form the condensation products of p-diamins and napthylaminsulfonic acids with para-aminophenols.

4. The process of manufacturing sulfur dyestuffs, which consists in heating with alkali polysulfids, in presence of a metallic salt and while adding a diluent, the indophenolsulfonic acids obtainable from the condensation products of p-diamins and napththylaminsulfonic acids with para-aminophenols.

5. As new products, blue to green sulfur dyestuffs obtainable by heating with alkali polysulfids the indophenolsulfonic acids obtainable from the products resulting from the condensation of p-diamins and naphthylaminsulfonic acids with phenols containing in para-position to the hydroxyl group a group containing nitrogen which, on condensation with amins, is converted into nitrogen bound in quinoidal manner, said dyestuffs being dark powders, soluble in alkali sulfids, to a solution from which the leuco dyestuff can be precipitated with common salt, insoluble in alcohol, almost soluble in concentrated sulfuric acid to a light-blue solution turning, when heated, to dark-blue, and dyeing cotton from the sulfur-alkaline solution fast blue to green tints.

6. As a new product, the green sulfur dyestuff, obtainable by heating with alkali polysulfids, in presence of a derivative of copper, the product resulting from the condensation of p-phenylenediamin and 1.8-naphthylaminsulfonic acid with p-aminophenol, said dyestuff being a dark-green powder, soluble in alkali-sulfids to a blue to yellowish solution from which the leuco-dyestuff can be precipitated with common salt, insoluble in alcohol, almost soluble in concentrated sulfuric acid to a light blue solution turning, when heated, to dark-blue, and dyeing cotton from the sulfur-alkaline solution fast green tints.

In testimony whereof, I affix my signature in presence of two witnesses.

Dr. WILHELM HAHNENKAMM.

Witnesses:
 JEAN GRUND,
 CARL GRUND.